(12) United States Patent
Hattori et al.

(10) Patent No.: US 8,764,415 B2
(45) Date of Patent: Jul. 1, 2014

(54) INTEGRATED-INVERTER ELECTRIC COMPRESSOR

(75) Inventors: Makoto Hattori, Aichi-ken (JP); Kazuki Niwa, Aichi-ken (JP); Koji Nakano, Aichi-ken (JP); Takashi Nakagami, Aichi-ken (JP); Takayuki Takashige, Aichi-ken (JP); Koji Toyama, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 694 days.

(21) Appl. No.: 12/230,138

(22) Filed: Aug. 25, 2008

(65) Prior Publication Data
US 2009/0246047 A1 Oct. 1, 2009

(30) Foreign Application Priority Data
Mar. 28, 2008 (JP) ................................. 2008-088598

(51) Int. Cl.
F04B 17/00 (2006.01)
F04B 35/04 (2006.01)

(52) U.S. Cl.
USPC ...................................... 417/410.1; 417/44.1

(58) Field of Classification Search
USPC ............................................. 417/44.1, 410.1
See application file for complete search history.

(56) References Cited

U.S. PATENT DOCUMENTS

| 5,872,332 | A | | 2/1999 | Verma | |
|---|---|---|---|---|---|
| 5,875,091 | A | * | 2/1999 | Rieken | 361/328 |
| 6,041,609 | A | * | 3/2000 | Hornsleth et al. | 62/259.2 |
| 6,403,880 | B1 | | 6/2002 | Elford et al. | |
| 6,404,297 | B2 | * | 6/2002 | Cherniski et al. | 333/12 |
| 6,552,912 | B1 | * | 4/2003 | Kanazawa et al. | 361/752 |
| 6,661,311 | B2 | * | 12/2003 | Delvart | 333/181 |

(Continued)

FOREIGN PATENT DOCUMENTS

| DE | 203 20 643 U1 | 1/2005 |
|---|---|---|
| DE | 603 13 430 T2 | 1/2008 |

(Continued)

OTHER PUBLICATIONS

Burklin, Die Ganze Elektronik. Munich: Burkli, Oct. 2005.—ISBN No. 99T200.(cited in German Office Action dated Jun. 9, 2011).

(Continued)

*Primary Examiner* — Devon Kramer
*Assistant Examiner* — Thomas Fink
(74) *Attorney, Agent, or Firm* — Westerman, Hattori, Daniels & Adrian, LLP

(57) ABSTRACT

An integrated-inverter electric compressor whose grounding effect and grounding reliability are increased by reliably grounding an inverter device to a housing and in which the size the inverter device are reduced by simplifying the grounding structure is provided. The integrated-inverter electric compressor includes an inverter device provided in an inverter container on the outer circumference of a housing. The inverter device includes an inverter module formed by integrating a power-related metal substrate and a resin case and is provided with a control-related substrate on the upper surface of the inverter module; the resin case is integrated with mounting legs provided at a plurality of locations on the circumference; the mounting legs are grounded to the power-related metal substrate and the control-related substrate; and grounding terminals, which frame-ground the substrates to the housing, are insert-molded in such a manner that the grounding terminals are securable to the inverter container with screws.

5 Claims, 6 Drawing Sheets

(56) References Cited

U.S. PATENT DOCUMENTS

| | | | |
|---|---|---|---|
| 7,207,187 B2* | 4/2007 | Funahashi et al. | 62/228.4 |
| 7,273,357 B2* | 9/2007 | Hattori et al. | 417/313 |
| 7,534,109 B2* | 5/2009 | Hattori et al. | 439/55 |
| 7,652,902 B2* | 1/2010 | Hattori et al. | 363/147 |
| 8,308,442 B2* | 11/2012 | Tsutsui et al. | 417/44.1 |
| 2001/0030362 A1 | 10/2001 | Grant | |
| 2003/0015778 A1* | 1/2003 | Soyano et al. | 257/678 |
| 2003/0200761 A1* | 10/2003 | Funahashi et al. | 62/228.4 |
| 2004/0257841 A1* | 12/2004 | Taguchi et al. | 363/40 |
| 2006/0192509 A1* | 8/2006 | Nakakita et al. | 318/139 |
| 2007/0002594 A1* | 1/2007 | Otsuka et al. | 363/37 |
| 2007/0052500 A1* | 3/2007 | Korich et al. | 333/202 |
| 2008/0087458 A1* | 4/2008 | Hattori et al. | 174/260 |
| 2008/0116838 A1* | 5/2008 | Hattori et al. | 318/722 |
| 2009/0255704 A1* | 10/2009 | Niwa et al. | 174/68.2 |
| 2009/0291002 A1* | 11/2009 | Kasai et al. | 417/410.1 |
| 2010/0014988 A1* | 1/2010 | Tsutsui et al. | 417/44.1 |
| 2010/0018243 A1* | 1/2010 | Tanaka et al. | 62/508 |
| 2010/0074772 A1* | 3/2010 | Hoshino et al. | 417/410.1 |

FOREIGN PATENT DOCUMENTS

| | | | |
|---|---|---|---|
| JP | 7-304327 | A | 11/1995 |
| JP | 10-210649 | A | 8/1998 |
| JP | 2001-136723 | A | 5/2001 |
| JP | 2002-136056 | A | 5/2002 |
| JP | 2003-324903 | A | 11/2003 |
| JP | 2004-162618 | A | 6/2004 |
| JP | 2004-190525 | A | 7/2004 |
| JP | 2007-315269 | A | 12/2007 |
| JP | 2007-318911 | A | 12/2007 |

OTHER PUBLICATIONS

German Office Action dated Jun. 9, 2011, issued in corresponding German Patent Application No. 10 2008 039 133.6.

Japanese Decision to Grant a Patent dated Sep. 11, 2012, issued in corresponding Japanese Patent Application No. 2008-088598, (7 pages), w/ English translation.

* cited by examiner

INTEGRATED-INVERTER ELECTRIC COMPRESSOR

BACKGROUND OF THE INVENTION

1. Field of the Invention

The present invention relates to an integrated-inverter electric compressor for an in-vehicle air-conditioning apparatus, the compressor being formed by integrating an inverter with the outer periphery of a housing accommodating electric motor and a compressor.

This application is based on Japanese Patent Application No. 2008-88598, the content of which is incorporated herein by reference.

2. Description of Related Art

Recently, various electric compressors having integrated inverters have been proposed for in-vehicle air-conditioning apparatuses. These integrated-inverter electric compressors have an inverter container (inverter box) on the outer circumference of a housing accommodating an electric motor and a compressor, and an inverter device, provided inside the inverter container, that converts DC power supplied from a high-voltage power supply unit to three-phase AC power and supplies it to the electric motor via a glass sealed terminal. In this way, the rotational speed of the compressor is variably controlled according to the air-conditioning load.

As described in Japanese Unexamined Patent Application, Publication No. 2004-162618, the inverter is integrated with the outer circumferential section of the compressor housing by providing a power-related substrate (including a pedestal and unit base) a control-related substrate (printed circuit board) in two vertical layers. The power-related substrate has a plurality of power semiconductor switching devices (IGBT) for converting DC power to three-phase AC power. The control-related substrate has a control and communication circuit having a device, such as a CPU, that operates at low voltage. The substrates are mounted to the outer circumferential section of the compressor housing by accommodating them inside an inverter case or an external frame.

Japanese Unexamined Patent Application, Publication No. HEI-7-304327 describes an air conditioner, for electric vehicles, which is capable of eliminating electromagnetic-wave interference by using shielded lines as power-supply lines, which supply DC power to an electric compressor driving device (inverter device) and three-phase lines which supply three-phase electric power from the electric compressor driving device to a motor, and by grounding the shield to a metal case for the components, including the electric compressor driving device, via a capacitor.

However, with an integrated-inverter electric compressor in which an inverter device, which includes a power-related substrate and a control-related substrate, is integrated with a housing, such as that described in Japanese Unexamined Patent Application, Publication No. 2004-162618, both substrates are frame-grounded separately. Therefore, the grounding structure is complicated, and to reduce the size of the inverter device, there are problems in how to frame-ground noise currents, such as electromagnetic noise generated at the power-related substrate due to the switching operation of the IGBT etc., and electromagnetic noise transmitted from the outside to the control-related substrate via a communication line, to the housing of the electric compressor in order to reduce noise interference and noise leaking to the outside.

In other words, when reducing the size of the inverter device, one problem is how to simplify the grounding structure from the power-related substrate and the control-related substrate to the electric compressor housing. Another problem is how to ground the power-related substrate and the control-related substrate to the electric compressor housing. Although Japanese Unexamined Patent Application, Publication No. HEI-7-304327 describes the metal case for components, including an electric compressor driving device, it does not describe any specific grounding structure.

BRIEF SUMMARY OF THE INVENTION

The present invention has been conceived in light of the above circumstances, and an object thereof is to provide an integrated-inverter electric compressor whose grounding effect and grounding reliability are increased by reliably grounding an inverter device to a housing. Additionally, the size and cost of the inverter device should be reduced by simplifying the grounding structure.

To achieve the above-described object, an integrated-inverter electric compressor according to the present invention provides the following solutions.

Specifically, the integrated-inverter electric compressor according to an aspect of the present invention has an inverter container, on the outer circumference of a housing accommodating an electric motor and a compressing mechanism, and an inverter device, disposed inside the inverter container, for supplying electric power to the electric motor by converting DC power from a high-voltage power source to three-phase AC power, wherein the inverter device includes an inverter module integrating a power-related metal substrate on which a semiconductor switching device is mounted with a resin case in which a plurality of terminals are integrally insert-molded, and is provided with a control-related substrate on which a control and communication circuit having a device that operates at low-voltage, such as a CPU, is mounted on the upper surface of the inverter module, wherein the resin case is integrated with mounting legs that are secured to the inverter container with screws at a plurality of locations on the circumference of the resin case, and wherein the mounting legs are electrically grounded to the power-related metal substrate and the control-related substrate, and grounding terminals that frame-ground the power-related metal substrate and the control-related substrate to the housing are insert-molded in such a manner that the grounding terminals are securable to the inverter container with the screws.

According to the aspect, since the power-related metal substrate and the control-related substrate are frame-grounded to the housing of the electric compressor by insert-molding the grounding terminals, which are electrically grounded to the power-related metal substrate and the control-related substrate, with the mounting legs of the resin case constituting the inverter module and securing the grounding terminals to the inverter containers with screws, the inverter device can be secured to the inverter container with the screws, and, at the same time, the grounding terminals can be grounded to the housing of the electric compressor via the screws. Therefore, the power-related metal substrate and the control-related substrate are reliably mounted to the frame, thus improving the grounding effect; noise currents, such as electromagnetic noise generated at the substrates due to the switching operation of the semiconductor switching devices and electromagnetic noise transmitted from the outside through signal lines, are reliably grounded; and malfunctions due to noise interference and noise leaking to the outside can be reduced. Moreover, since the power-related metal substrate and the control-related substrate can be grounded simultaneously through common grounding terminals, the grounding structure is simplified, and the size and cost of the inverter device can be reduced.

Moreover, the integrated-inverter electric compressor according to the above-described aspect may be configured such that the grounding terminals are electrically grounded to a high-voltage grounding pattern on the power-related metal substrate and to a low-voltage grounding pattern on the control-related substrate via respective capacitors.

According to the above-described configuration, since the high-voltage grounding pattern on the power-related metal substrate and the low-voltage grounding pattern on the control-related substrate are electrically connected to the grounding terminals via the respective capacitors, high-frequency noise currents (electromagnetic noise) can be frame-grounded to the housing of the electric compressor via the grounding terminals. Therefore, noise interference between the substrates and noise leaking to the vehicle can be reliably reduced.

Furthermore, with any one of the above-described integrated-inverter electric compressors, the grounding terminals may have through-holes through which the screws are passed and may be integrally insert-molded with the resin case such that the grounding terminals are exposed at mounting holes in the mounting legs.

According to the above-described configuration, since the grounding terminals have through-holes through which the screws are passed and are integrally insert-molded with the resin case such that the grounding terminals are exposed at mounting holes in the mounting legs, the screws can be passed through the through-holes of the grounding terminals to secure the mounting legs to the inverter container. In this way, the grounding terminals can also be grounded to the housing of the electric compressor via the screws. Therefore, since the grounding terminals are always in contact with the housing and are reliably frame-grounded, the grounding effect and the reliability of the grounding can be increased.

Furthermore, with any one of the above-described integrated-inverter electric compressors, the grounding terminals may each branch into a first terminal part and a second terminal part, wherein the first terminal part is electrically grounded to the power-related metal substrate and the second terminal part is electrically grounded to the control-related substrate.

According to the above-described configuration, since the grounding terminals each branch into a first terminal part and a second terminal part, wherein the first terminal part is electrically grounded to the power-related metal substrate and the second terminal part is electrically grounded to the control-related substrate, noise currents (electromagnetic noise) from the power-related metal substrate and the control-related substrate do not flow from one branch of the grounding terminal to the other branch, and the noise current grounded to the first terminal part and the second terminal part can be reliably frame-grounded to the housing of the electric compressor via one of the branches of the grounding terminals. Therefore, the grounding effect and the reliability of the grounding can be increased.

Furthermore, with any one of the above-described integrated-inverter electric compressors, the second terminal part may be directly connected to a grounding pattern on the control-related substrate via a through-hole.

Since the second terminal part is directly connected to a grounding pattern on the control-related substrate via a through-hole, the control-related substrate can be supported by this second terminal part. Therefore, the vibration-resistance of the control-related substrate can be improved.

Furthermore, with any one of the above-described integrated-inverter electric compressors, the mounting legs are provided at four corner sections of the rectangular resin case, and the grounding terminals are provided at at least two of the corner sections of the mounting legs surrounding the P-N terminals, which are insert-molded with the resin case.

According to the above-described configuration, since the grounding terminal are provided at at least two of the corner sections of the mounting legs surrounding the P-N terminals, which are insert-molded with the resin case, noise currents (electromagnetic noise) from the power-related metal substrate and the control-related substrate can be frame-grounded via one of the grounding terminals, whichever is closer. Therefore, the grounding effect and the reliability of the grounding can be improved.

According to the present invention, since the inverter device can be secured to the inverter container with screws and the grounding terminals can be grounded to the housing of the electric compressor, the power-related metal substrate and the control-related substrate can be reliably frame-grounded to increase the grounding effect, to reliably ground noise currents, such as electromagnetic noise generated at the substrates, and to reduce malfunctions due to noise interference and noise leaking to the outside. Moreover, since the power-related metal substrate and the control-related substrate can be grounded together through common grounding terminals, the grounding structure can be simplified, and the size and cost of the inverter device can be reduced.

DETAILED DESCRIPTION OF THE INVENTION

An embodiment of the present invention will be described below with reference to FIGS. 1 to 6.

Figure 1:
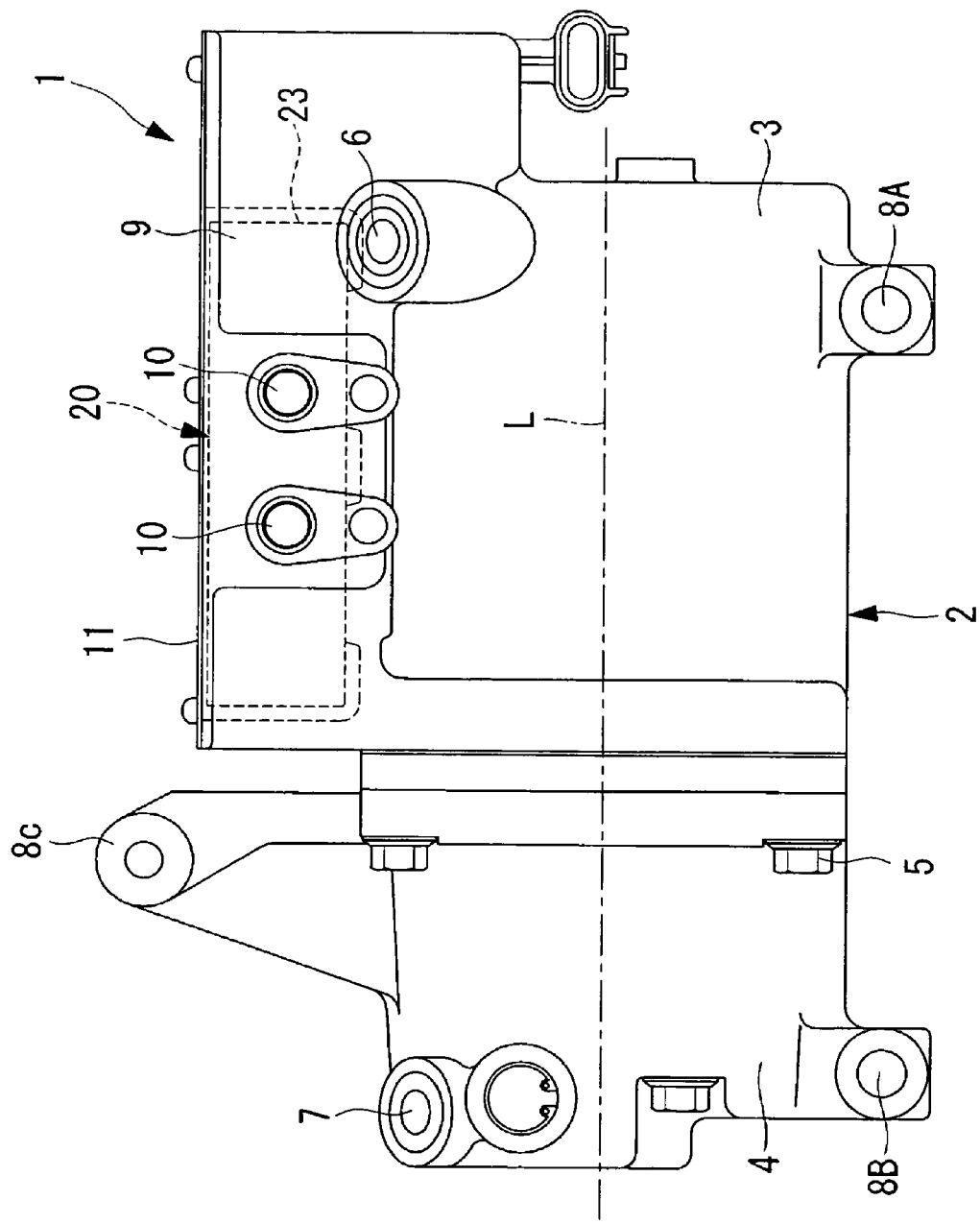
FIG. 1 is an external side view of an integrated-inverter electric compressor according to one embodiment of the present invention.

FIG. 1 illustrates an external side view of an integrated-inverter electric compressor 1 according to an embodiment of the present invention. The integrated-inverter electric compressor 1 includes a housing 2. The housing 2 is constructed by integrally securing a motor housing 3 for accommodating an electric motor, not shown in the drawing, and a compressor housing 4 for accommodating a compressing mechanism, not shown in the drawing, by tightening bolts 5. The motor housing 3 and the compressor housing 4 are pressure resistant containers formed by aluminum die-casting.

The electric motor and the compressing mechanism, which are not shown in the drawing, accommodated inside the housing 2 are linked via a motor shaft, and the compressing mechanism is driven as a result of the electric motor being rotated. A refrigerant suction port 6 is provided at one side (on the right side of FIG. 1) of the motor housing 3, so that low-temperature and low-pressure refrigerant gas drawn from this refrigerant suction port 6 into the motor housing 3 flows around the electric motor in the L direction of the motor shaft and is drawn into the compressing mechanism, where the refrigerant gas is compressed. As a result of being compressed by the compressing mechanism, high-temperature and high-pressure refrigerant gas is discharged into the compressor housing 4 and is expelled to the outside via a discharge port 7 provided at the other end (on the left side of FIG. 1) of the compressor housing 4.

The housing 2 has three mounting legs 8A, 8B, and 8C; for example, one leg is at a lower part at one side (on the right side of FIG. 1) of the motor housing 3, one leg is at a lower part at the other end (on the left side of FIG. 1) of the compressor housing 4, and one leg is at an upper part of the compressor housing 4. The integrated-inverter electric compressor 1 is secured to a vehicle via these mounting legs 8A, 8B, and 8C by affixing it with a bracket and bolts on a side wall, etc., of a motor for driving, which is provided inside the engine compartment of the vehicle.

A box-shaped inverter container 9 is integrally formed at an upper part of the outer circumferential part of the motor housing 3. The inverter container 9 is shaped like a box which has an open top and which is composed of surrounding walls of a certain height. Two power cable outlets 10 are provided on a side surface of the inverter container 9. The top of the inverter container 9 is covered with a lid 11 that is secured with screws.

Figure 2:
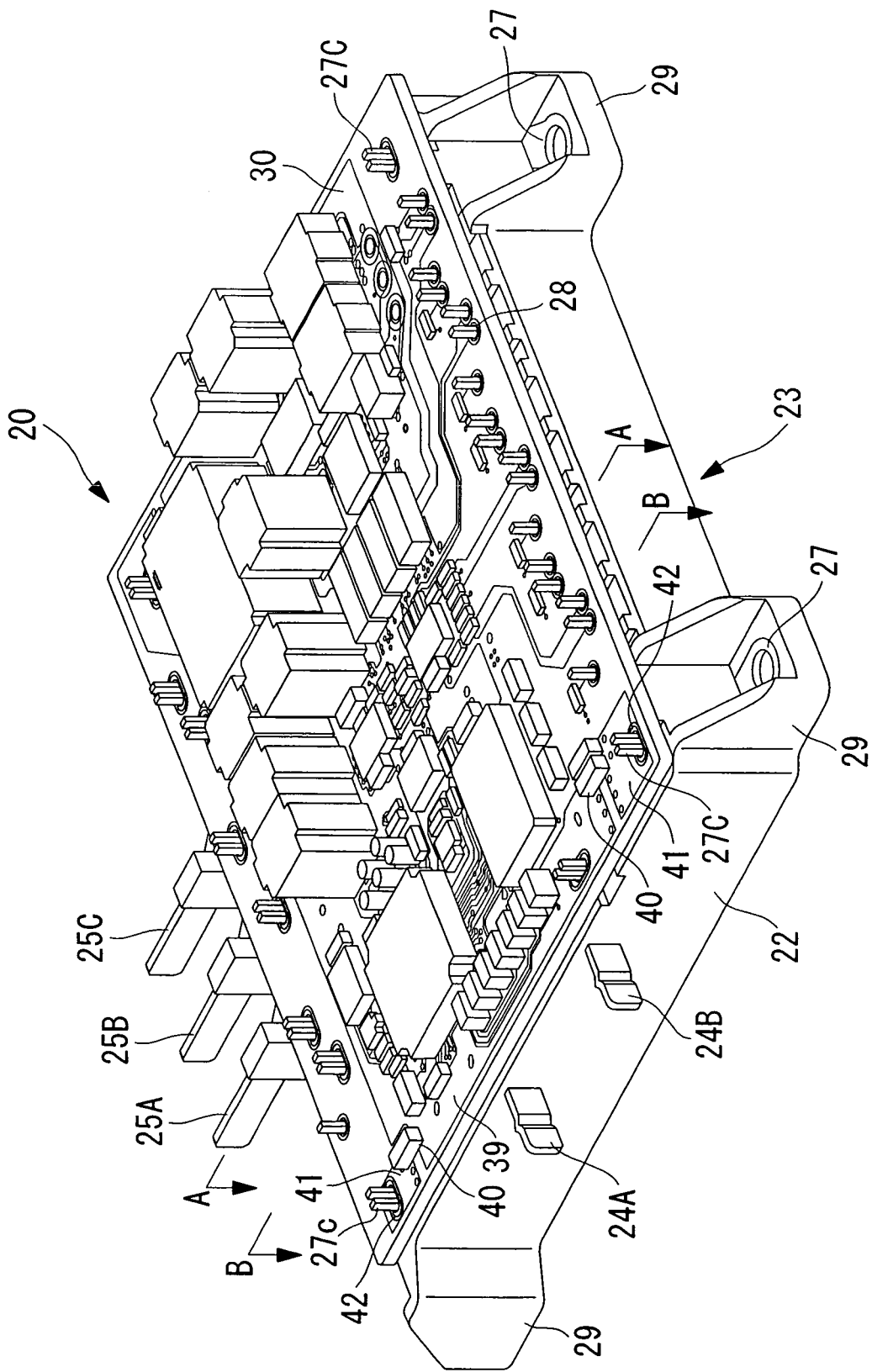
FIG. 2 is a perspective view of an inverter device integrated with the integrated-inverter electric compressor shown in FIG. 1.
Figure 3:
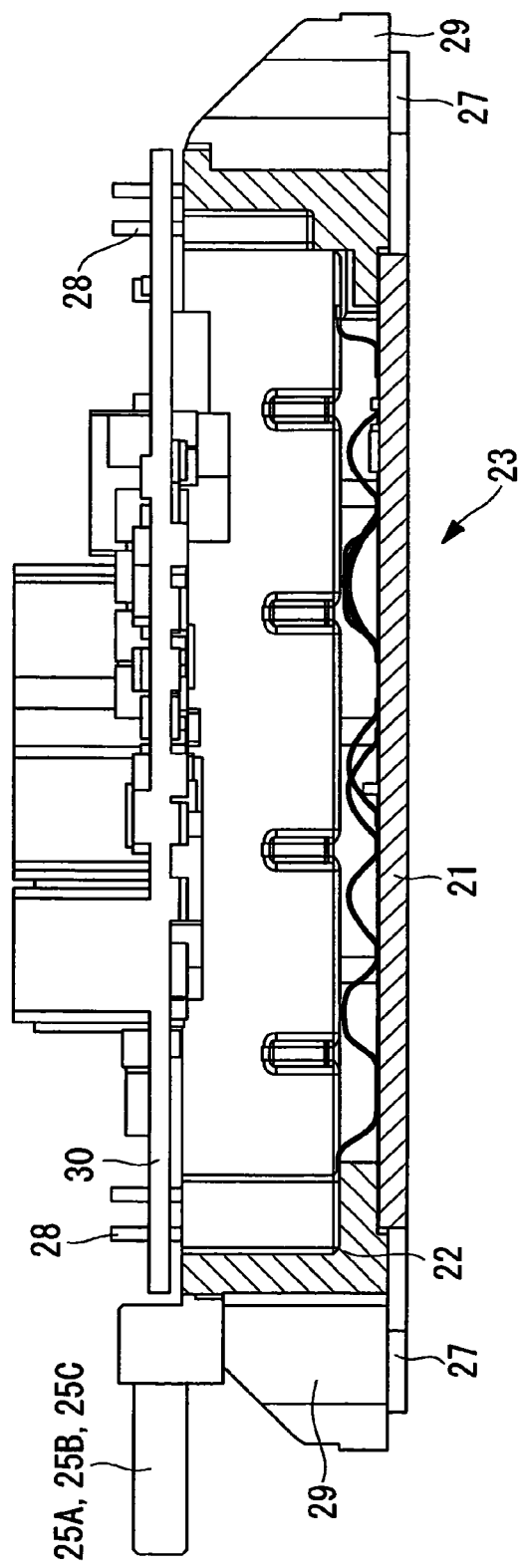
FIG. 3 is a cross-sectional view of the inverter device taken along line A-A in FIG. 2.
Figure 4:
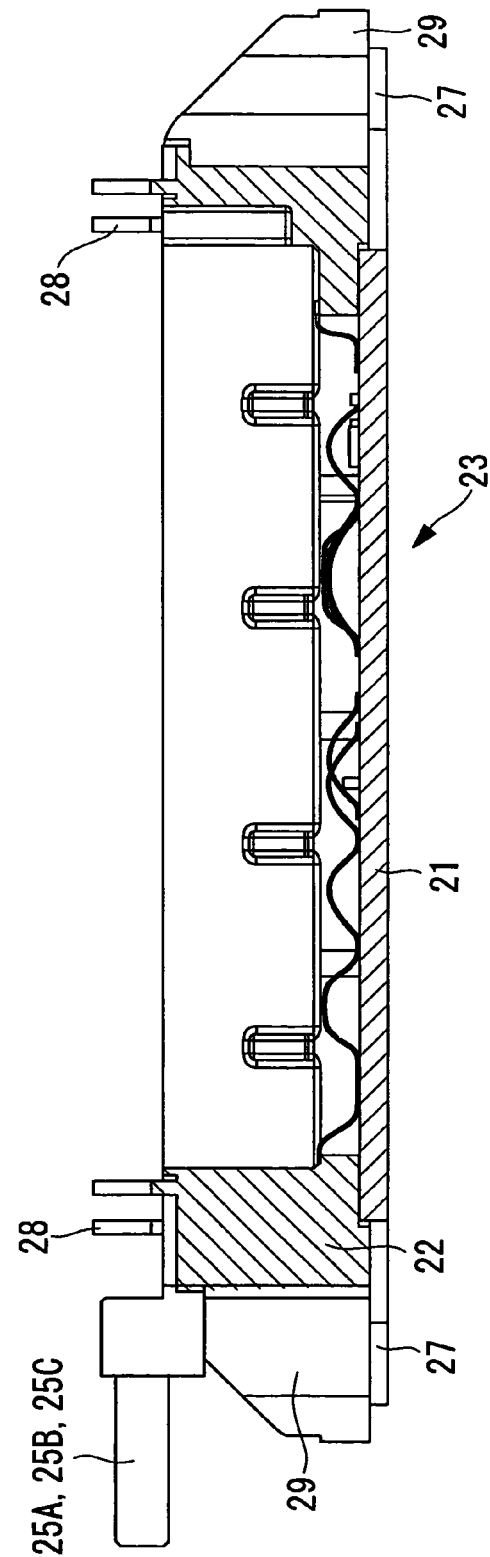
FIG. 4 is a cross-sectional view of the inverter device, excluding the control-related substrate, taken along line B-B in FIG. 2.
Figure 5:
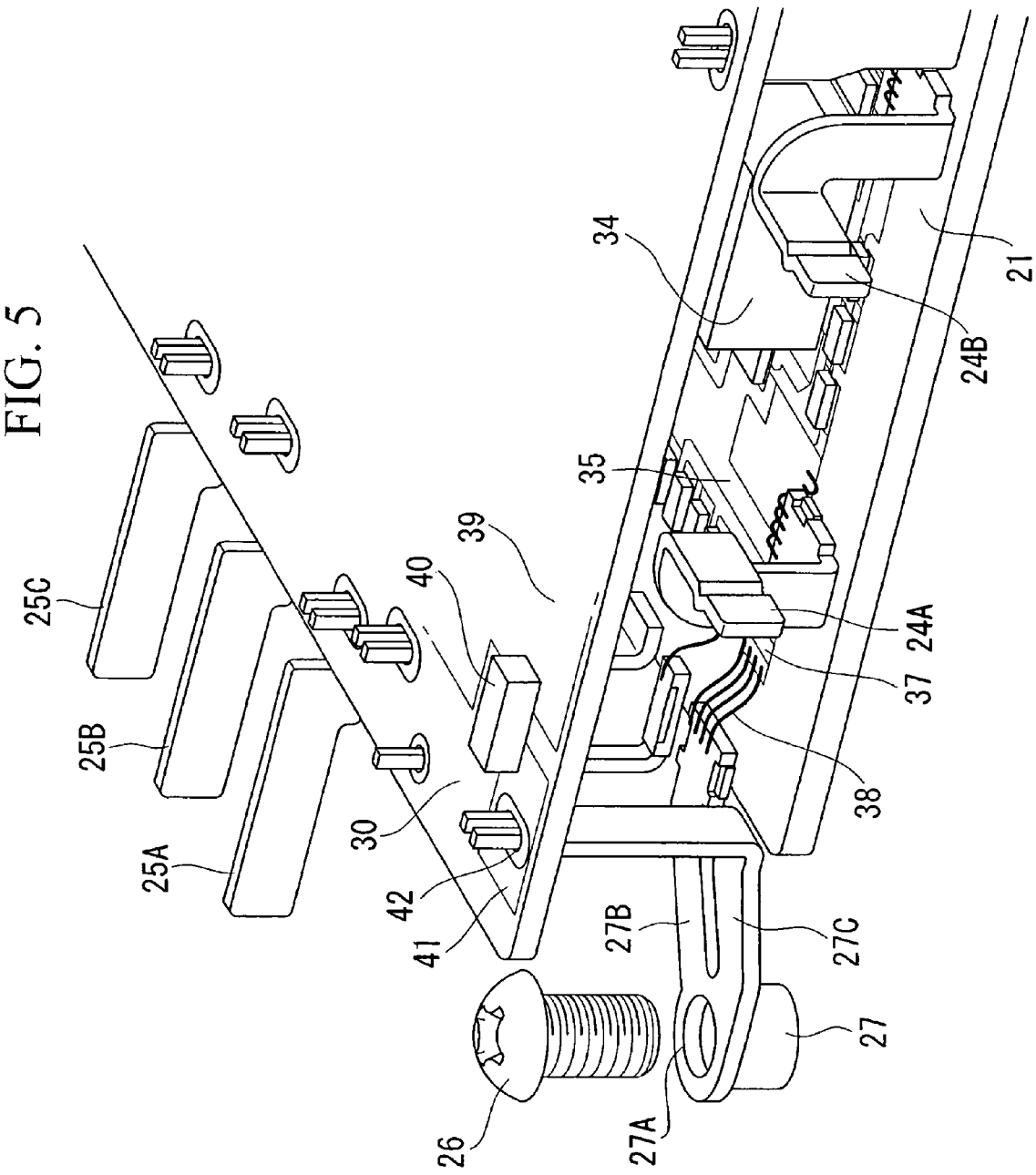
FIG. 5 is a perspective view of a corner of the inverter module of the inverter device shown in FIG. 2, with the resin case removed.
Figure 6:
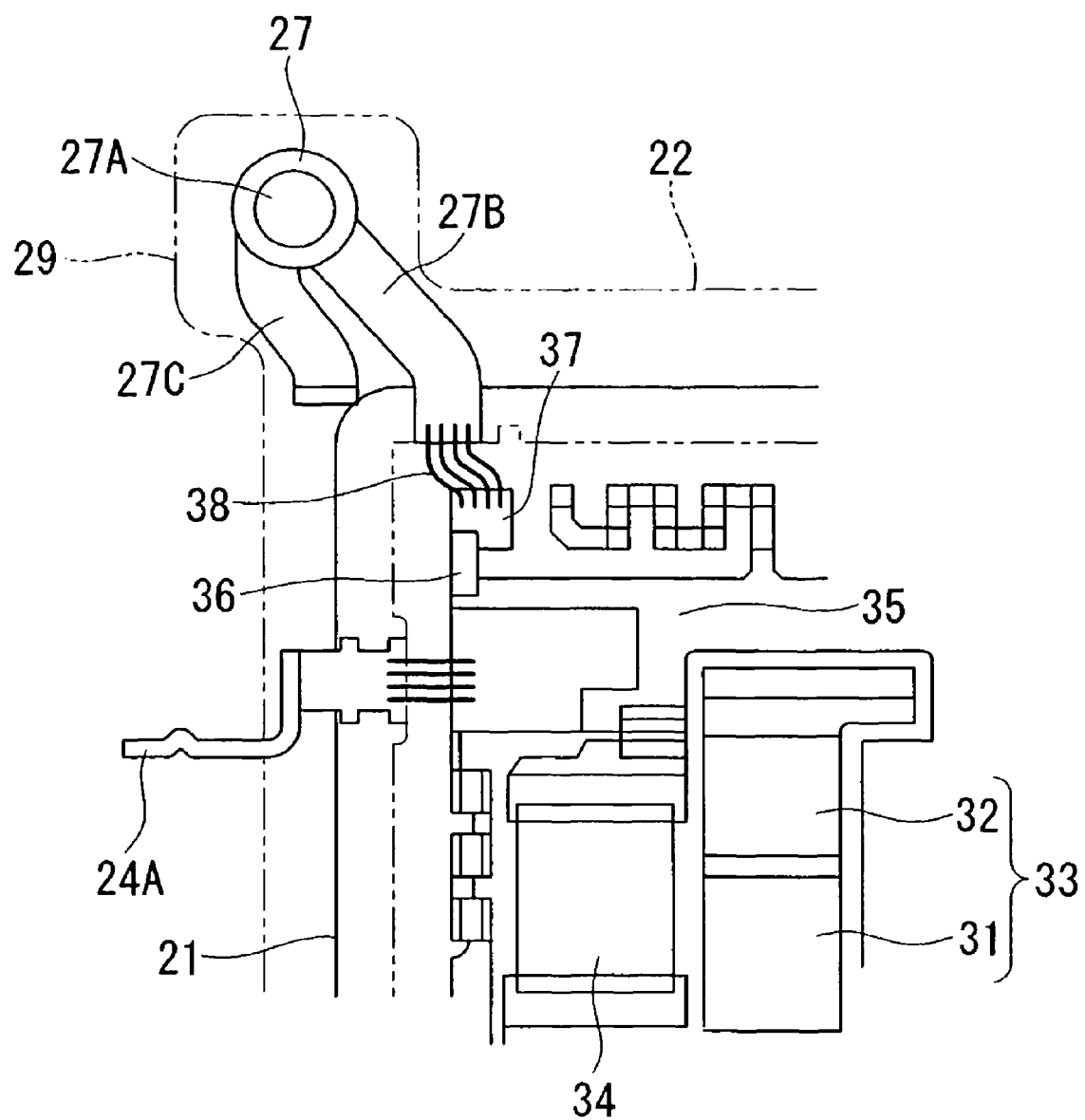
FIG. 6 is a partial plan view of a power-related metal substrate of the inverter device shown in FIG. 2.

An inverter device 20 that converts DC power, which is supplied via a high-voltage cable from an in-vehicle high-voltage power supply unit (not shown in the drawings), a battery, or the like, to three-phase AC power and supplies it to the electric motor accommodated inside the motor housing 3 is accommodated inside the inverter container 9. FIG. 2 is a perspective view of the inverter device 20. FIGS. 3 and 4 are cross-sectional views taken along lines A-A and B-B, respectively, in FIG. 2. FIG. 5 is a perspective view of a corner of the inverter module with the resin case removed. FIG. 6 is a partial plan view of a power-related metal substrate at the corner.

As shown in FIG. 6, a plurality (six; only one of which is shown in FIG. 6) of semiconductor switching devices 33, each formed of an IGBT 31 and a diode 32, are mounted as bare chips, and the inverter device 20 includes an inverter module 23 integrally formed by insert-molding a power-related metal substrate 21, made of an aluminum plate, on which a snubber circuit, which includes a snubber capacitor 34, and so on are mounted, with a resin case 22. In addition to the power-related metal substrate 21, the resin case 22 is integrally formed by insert-molding P-N terminals 24A and 24B connected to the high-voltage power supply, U-V-W terminals 25A, 25B, and 25C that supply three-phase AC power to the electric motor, numerous connecting terminals 28 that connect the ground terminals 27, which is described below, the power-related metal substrate 21, and a control-related substrate 30, which is described below, and so on.

The resin case 22, which is rectangular shaped, has the P-N terminals 24A and 24B protruding from one side along the side surface of the inverter container 9, where the power cable outlets 10 are provided, and has the U-V-W terminals 25A, 25B, and 25C protruding from an adjacent side close to the compressor housing 4. Corner sections of the resin case 22 are constructed by integrating mounting legs 29, which are each secured to the bottom surface of the inverter container 9 with a screw 26 (see FIG. 5).

The control-related substrate (printed circuit board) 30, which is slightly larger than the resin case 22, is disposed on the upper surface of the resin case 22 forming the inverter module 23 and is connected with numerous connecting terminals 28 and grounding terminals 27. A control and communication circuit having a device that operates at low voltage, such as a CPU, is mounted on the control-related substrate 30 so as to control a power-related circuit including the semiconductor switching devices 33, which are mounted on the power-related metal substrate 21, on the basis of control and communication signals from a higher-level control device.

As shown in FIG. 2, the inverter device 20 is formed by providing the control-related substrate 30 on the upper surface of the inverter module 23. In this state, the inverter device 20 is accommodated inside the inverter container 9, and the mounting legs 29 of the resin case 22 constituting the inverter module 23 are secured to the bottom surface of the inverter container 9 with screws 26. In this way, the inverter device 20 is mounted to the outer circumference of the housing 2 (motor housing 3).

Each of the mounting legs 29 is integrally formed by insert-molding a grounding terminal 27, having a through-hole 27A through which the screw 26 passes, with the resin case 22 in such a manner that the grounding terminal 27 is exposed at a mounting hole. As shown in FIGS. 5 and 6, the grounding terminals 27 each branch into a first terminal part 27B and a second terminal part 27C. The first terminal part 27B extends into the resin case 22 on the upper surface of the power-related metal substrate 21, and the second terminal part 27C is bent upward at an intermediate point, passes through the upper section of the resin case 22, and extends toward the control-related substrate 30.

The end of the first terminal part 27B is connected by a wire bonder 38 to a grounding pattern 37, which is connected to a high-voltage grounding pattern 35 on the power-related metal substrate 21 through a capacitor 36. In this way, the grounding terminals 27 and the high-voltage grounding pattern 35 on the power-related metal substrate 21 are electrically grounded. The end of the second terminal part 27C is soldered, through a through-hole 42, to a grounding pattern 41, which is connected to a low-voltage grounding pattern 39 on the control-related substrate 30 through a capacitor 40. In this way, the grounding terminals 27 and the low-voltage grounding pattern 39 on the control-related substrate 30 are electrically grounded.

The grounding terminals 27 are formed in contact with the bottom surface of the inverter container 9, i.e., housing 2, with the screws 26 by securing the mounting legs 29 of the resin case 22 on the bottom surface of the inverter container 9 with the screws 26 when the inverter device 20 is mounted to the inverter container 9. In this way, the power-related metal substrate 21 and the control-related substrate 30 are frame-grounded to the housing 2 of the electric compressor 1 through a single grounding terminal 27.

Furthermore, the grounding terminals 27 may be insert-molded with the mounting legs 29 at all four corner sections of the resin case 22 in order to increase the strength of the resin case 22. However, the two grounding terminals 27 provided in the mounting legs 29 at two of the corner sections surrounding the P-N terminals 24A and 24B are actually grounded to the power-related metal substrate 21 and the control-related substrate 30. In other words, in this embodiment, the power-related metal substrate 21 and the control-related substrate 30 are frame-grounded to the housing 2 of the electric compressor 1 at two locations.

According to the above-described configuration of this embodiment, the following advantages are achieved.

DC power supplied from an in-vehicle power supply unit to the inverter device 20 of the electric compressor 1 through a high-voltage cable is input to the power circuit of the power-related metal substrate 21 via the P-N terminals 24A and 24B, converted to three-phase AC power of a control command frequency by the switching operation of the semiconductor switching devices 33, which are controlled by the control circuit of the control-related substrate 30, and then supplied to the electric motor inside the motor housing 3 via the U-V-W terminals 25A, 25B, and 25C and the glass sealed terminal.

In this way, the electric motor is rotationally driven at the control command frequency, and the compressing mechanism is operated. The operation of the compressing mechanism causes the low-temperature and low-pressure refrigerant gas to be drawn into the motor housing 3 from the refrigerant suction port 6. The refrigerant flows toward the compressor housing 4 around the electric motor in the L direction of the motor shaft and is drawn into the compressing mechanism, where it is compressed to a high-temperature and high-pressure state. Then, the refrigerant is discharged outside the electric compressor 1 through the discharge port 7.

During this process, the low-temperature and low-pressure refrigerant gas that is drawn from the refrigerant suction port 6 into the motor housing 3 and flows in the L direction of the motor shaft cools the power-related metal substrate 21 of the inverter device 20, which is disposed in close contact with the bottom surface of the inverter container 9 by the housing wall of the motor housing 3. In this way, heat-generating components, such as the semiconductor switching devices 33, mounted on the power-related metal substrate 21 are cooled, and their heat-resistance is maintained.

In the inverter device 20, noise interference and noise leaking to the outside may be caused by electromagnetic noise generated at the power-related metal substrate 21 by the switching operation of the semiconductor switching devices 33 and by electromagnetic noise, from an external control device, transmitted to the control-related substrate 30 through signal lines and so on. Thus, such electromagnetic noise (noise currents of high frequency components) is discharged to the grounding terminal 27 from the high-voltage grounding pattern 35 on the power-related metal substrate 21 and the low-voltage grounding pattern 39 of the control-related substrate 30, through capacitors 36 and 40, respectively, and the electromagnetic noise is frame-grounded to the housing 2 of the electric compressor 1.

However, in this embodiment, the grounding terminals 27, which are ground at the power-related metal substrate 21 and the control-related substrate 30 through the branching first terminal part 27B and second terminal part 27C, are insert-molded with the mounting legs 29 of the resin case 22, which forms the inverter module 23. The grounding terminals 27 can be grounded to the housing 2 of the electric compressor 1 by securing the grounding terminals 27 together with the mounting legs 29 to the bottom surface of the inverter container 9 with the screws 26 when the grounding terminals 27 are mounted to the inverter container 9 of the inverter device 20. Therefore, the power-related metal substrate 21 and the control-related substrate 30 can be reliably frame-grounded to the housing 2 of the electric compressor 1 with the grounding terminals 27, having a branching structure.

Accordingly, the grounding effect can be increased by reliably frame-grounding the power-related metal substrate 21 and the control-related substrate 30; noise currents, such as electromagnetic noise caused by the switching operation of the semiconductor switching devices 33 on the substrates 21 and 30 and electromagnetic noise transmitted from the outside through signal lines, can be reliably grounded; and malfunctions due to electromagnetic noise interference and electromagnetic noise leaking to the outside can be reduced.

Furthermore, since the power-related metal substrate 21 and the control-related substrate 30 can be grounded together through common grounding terminals 27, the grounding structure can be simplified, the size of the inverter device 20 can be reduced, and costs can be reduced.

In particular, since the grounding terminals 27 are integrally insert-molded with the resin case 22 and are exposed at the mounting holes of the mounting legs 29, when the inverter device 20 is mounted, the mounting legs 29 can be secured to the bottom surface of the inverter container 9 by passing the screws 26 through the through-holes 27A of the grounding terminals 27, and, at the same time, the grounding terminals 27 can be grounded to the housing 2 of the electric compressor 1 via the screws 26. Therefore, since the grounding terminals 27 are always in contact with the housing 2 and are reliably frame-grounded, the grounding effect and the reliability of the grounding can be increased.

Since the grounding terminals 27 each have a branching structure which branches into the first terminal part 27B and the second terminal part 27C, noise currents (electromagnetic noise) from the power-related metal substrate 21 and the control-related substrate 30 do not flow from one branching grounding terminal to the other grounding terminal, and the noise current grounded to the first terminal part 27B and second terminal part 27C can be reliably frame-grounded to the housing 2 of the electric compressor 1 via one of the branching grounding terminals 27. Therefore, the grounding effect and the reliability of the grounding can be increased.

Furthermore, since the above-described second terminal part 27C is directly soldered to the through-hole 42 on the control-related substrate 30, the second terminal part 27C can also be used as a supporting member of the control-related substrate 30. Therefore, the vibration-resistance of the control-related substrate 30 can be improved.

Moreover, since the grounding terminals 27 are provided on the mounting legs 29 on both corner sections where at least the P-N terminals 24A and 24B of the resin case 22 are insert-molded, and at least two of the locations are grounded, noise currents (electromagnetic noise) from the power-related metal substrate 21 and the control-related substrate 30 can be frame-grounded through one of the closer grounding terminals 27, whichever is closer. Therefore, the grounding effect and the reliability of the grounding can be increased.

The present invention is not limited to the embodiments described above, and various modifications may be made within the scope of the invention. For example, the above-described embodiment has been illustrated in terms of an example in which the inverter container 9 and the motor housing 3 are integrally formed. However, these do not necessarily have to be integrally formed, and an inverter container 9, which is a separate member, can be mounted on the motor housing 3. Furthermore, the compressing mechanism is not limited, and any type of compressing mechanism may be used.

Moreover, the above-described embodiment has been described in terms of an example in which only two of the grounding terminals 27 of the grounding terminals 27 insert-molded with the mounting legs 29, which are provided at the four corner sections of the resin case 22, are grounded. However, the embodiment is not limited thereto, and, instead, one, three, or more of the grounding terminals 27 may be grounded.

What is claimed is:

1. An integrated-inverter electric compressor, comprising:
a housing;
an electric motor and a compressing mechanism inside the housing;

an inverter container disposed on an outer circumference of the housing; and an inverter device, disposed inside of and separable from inside the inverter container, for supplying electric power to the electric motor by converting DC power from a high-voltage power source to three-phase AC power, the inverter device being a one piece inverter module comprising: a power-related metal substrate on which a semiconductor switching device is mounted; a control-related substrate on which a control and communication circuit having a device that operates at low-voltage is mounted, the control-related substrate located on an upper surface of the inverter module above the power-related metal substrate, a rectangular resin case surrounding the inverter module, the resin case integrated with mounting legs at four corner sections of the rectangular resin case, the resin case located outside an outer periphery of the power-related metal substrate and the control-related substrate, the mounting legs being secured to the inverter container with screws;

a common grounding terminal integrally insert molded into at least one of the mounting legs located at an outside corner of the power-related metal substrate and the control related substrate, the common grounding terminal comprising a flat conductor branching from a through hole into a first terminal part and a second terminal part, the first terminal part extending to the power-related substrate and being electrically grounded to and structurally connected to the power-related metal substrate, and the second terminal part extending upwardly to and being electrically grounded to and structurally connected to the control-related substrate, the through-hole providing a passage for one of the screws to secure the inverter module to the inverter container; and a high-voltage source and high-voltage grounding pattern from the power-related metal substrate and a low-voltage source and a low-voltage grounding pattern from the control-related substrate both being grounded via respective capacitors through the common grounding terminal.

2. The integrated-inverter electric compressor according to claim 1, wherein the second terminal part is directly connected to a grounding pattern on the control-related substrate through a through-hole.

3. The integrated-inverter electric compressor according to claim 1, wherein the mounting legs are provided at four corner sections of the rectangular resin case, and the grounding terminals are provided at at least two of the corner sections of the mounting legs surrounding P-N terminals, which are insert-molded with the resin case.

4. The integrated-inverter electric compressor according to claim 1, wherein the inverter module is a one-piece cup-like inverter module comprising the resin case side surface integrated with the power-related metal substrate.

5. The integrated-inverter electric compressor according to claim 1, wherein the upper surface of the inverter module is a top surface of the inverter module.

* * * * *